J. R. COE.
MEANS FOR SCALPING OR OVERHAULING METAL.
APPLICATION FILED DEC. 30, 1918.

1,328,034.

Patented Jan. 13, 1920.
2 SHEETS—SHEET 1.

INVENTOR
JAMES R. COE
BY
Bartlett Brownell
ATTORNEYS

J. R. COE.
MEANS FOR SCALPING OR OVERHAULING METAL.
APPLICATION FILED DEC. 30, 1918.

1,328,034.

Patented Jan. 13, 1920.
2 SHEETS—SHEET 2.

INVENTOR
JAMES R. COE
BY
Bartlett Brownell
ATTORNEYS

UNITED STATES PATENT OFFICE.

JAMES ROBERT COE, OF WATERBURY, CONNECTICUT, ASSIGNOR TO THE AMERICAN BRASS COMPANY, OF WATERBURY, CONNECTICUT, A CORPORATION OF CONNECTICUT.

MEANS FOR SCALPING OR OVERHAULING METAL.

1,328,034.  Specification of Letters Patent.  Patented Jan. 13, 1920.

Application filed December 30, 1918. Serial No. 268,882.

*To all whom it may concern:*

Be it known that I, JAMES R. COE, a citizen of the United States, residing at Waterbury, county of New Haven, State of Connecticut, have invented a certain new and useful Improvement in Means for Scalping or Overhauling Metal, of which the following is a full, clear, and exact description.

My invention relates to means for scalping or overhauling sheets or plates of brass or similar material, and has for its object to provide for accomplishing this result in a more thorough and efficient manner, with less cutting of the metal than heretofore and with less power. It also has for its object to provide a means in which loss and damage due to breakage is reduced, and in which broken parts can be easily and economically replaced. It also has for its object to provide a machine in which a plate can be both straightened and overhauled in one operation.

Heretofore in the scalping of metal the bars have been rolled down to a considerable extent and then have been passed between cutters which have made a surface cut down to a definite plane corresponding to the adjustment of the cutter. Inasmuch as in the scalping operation the result desired is the removal of any extraneous matter, such as scale and the like, and the cleaning out of pits, and the production of a smooth surface is not of particular importance, the removal of any metal which is not necessary for the removal of the scale on the surface or the contents of pits results in waste, the unnecessarily cut away metal resulting in scrap which has to be re-melted and re-cast and the cutting away of this unnecessary metal reducing the mass already in hand and also consuming power in the cutting operation, and also resulting in the corresponding wear and tear upon the cutter and the machine. By my invention these losses are largely reduced.

In order to obtain satisfactory results in scalping, the removal of only the objectionable portions of the surface is necessary since, although the surface, after these portions are removed, may be somewhat uneven, the sheet or plate is afterward rolled down to a lesser thickness, in which process any unevenness which may be due to cleaning out of pits upon the surface will be eliminated. In order to take advantage of this fact I have provided a machine which acts upon the plate or strip locally, according to the condition of the various parts of its surface, as distinguished from removing a layer of uniform thickness. This results in producing a clean, though somewhat uneven, surface to be evened up by the subsequent rolling operation. Whatever the ultimate thinness of the desired product, I find that if a bar cast one inch in thickness is rolled into a plate of a half inch in thickness, and then is passed through my overhauling machine, the surface impurities will be substantially removed with a minimum amount of labor and time. The invention is particularly adapted for overhauling brass plates or sheets.

The following is a description of an embodiment of my invention, reference being had to the accompanying drawings, in which.

Referring more particularly to the drawings, 1 is the frame of a machine having feed rolls 2—2' and 3—3', the same being driven as indicated by arrows by suitable means (not shown) so as to move from right to left the plate 4 which is to be overhauled. 5 and 5' are ordinary straightening rolls also positively driven by means not shown so that they also tend to move the plate 4 from right to left. 6 are adjusting screws. Between the feed rolls 2—2' and the feed rolls 3—3' are two cutter-heads 7—7' on shafts mounted in the frame of the machine and caused to revolve by means not shown, the upper cutter-head being rotated in a counterclockwise direction and the lower in a clockwise direction. Between these cutter-heads 7—7' and the feed rolls 2—2' are shields 8—8' for shielding the rolls 2—2' against dust or chips thrown off by the cutter-heads. Between the cutter-heads 7—7' and the rolls 3—3' are air blasts 9—9' directed rearwardly upon the plate 4 so as to blow away any dust or chips which might otherwise reach the rolls 3—3'.

Figure 2:
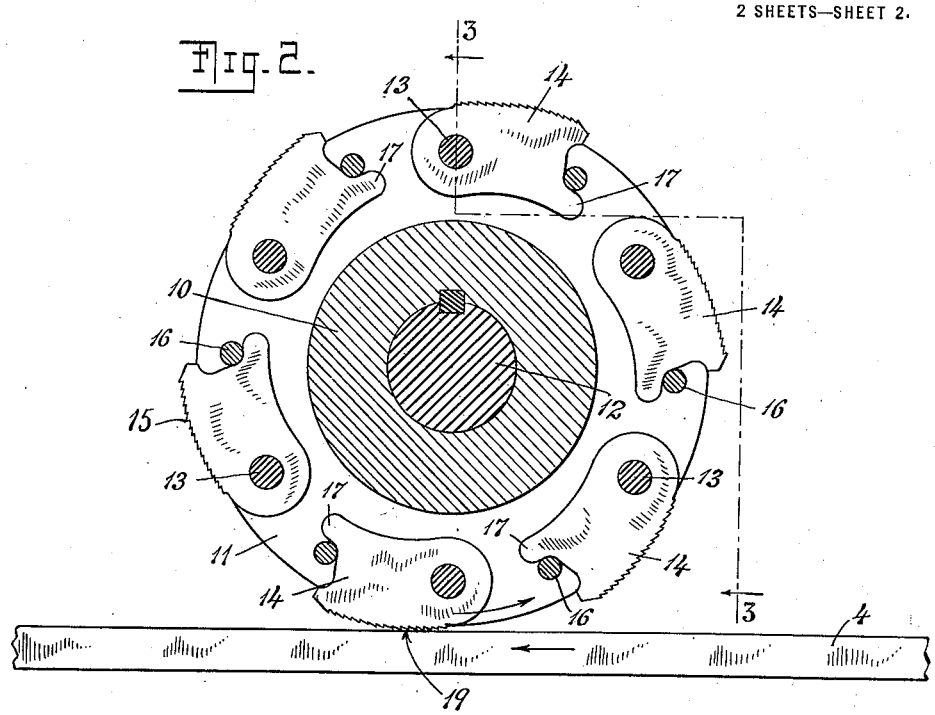
Fig. 2 shows an enlarged view of the peculiar cutter-head which I have invented for embodying my invention.
Figure 3:
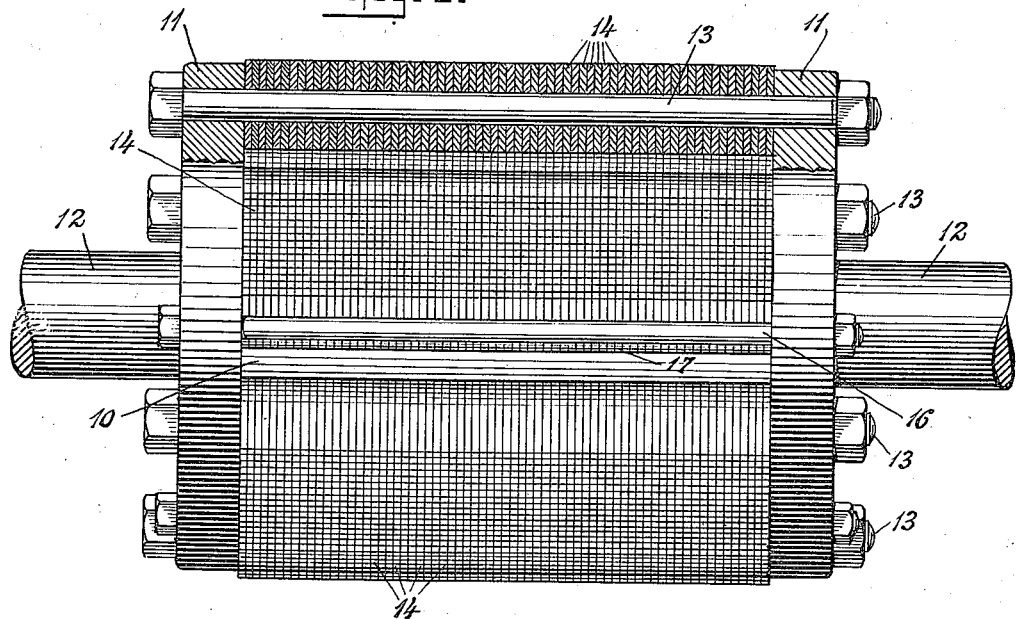
Fig. 3 shows said cutter-head partly in side elevation and partly in section on the line 3—3.

The cutter-head used by me in embodying my invention consists of a central core 10, having end plates 11—11 and supported by the shaft 12—12 and constituting a drum for supporting movable cutting members. Between the end plates extend six rods 13 upon each of which are pivotally mounted a plurality of independently movable cutting members 14. For a cutter-head eight inches in diameter I have found it satisfactory to make the movable cutting members 14 of a thickness of one-sixteenth ($\frac{1}{16}$th) of an inch so that for a cutter-head having a width of eight inches there would be in each group one hundred and twenty-eight such independently movable cutting members. These cutting members are made of hardened steel and are provided with a series of cutting teeth 15 upon their exterior surfaces, there being a plurality of fine cutting teeth arranged in the form of a curve which is preferably the arc of a circle whose radius meter is slightly less than the radius of the cutter-head, these radii in the illustration being shown at the ratio 8 to 9. The cutting members 14, when the cutter-head is revolved, tend to fly out under the action of centrifugal force and are limited in their outward movements by proper abutting surfaces. In the form shown in Fig. 2, these abutting surfaces are furnished by rods 16, carried by the end plates, which are engaged by a projection 17 upon each cutting member.

Figure 1:
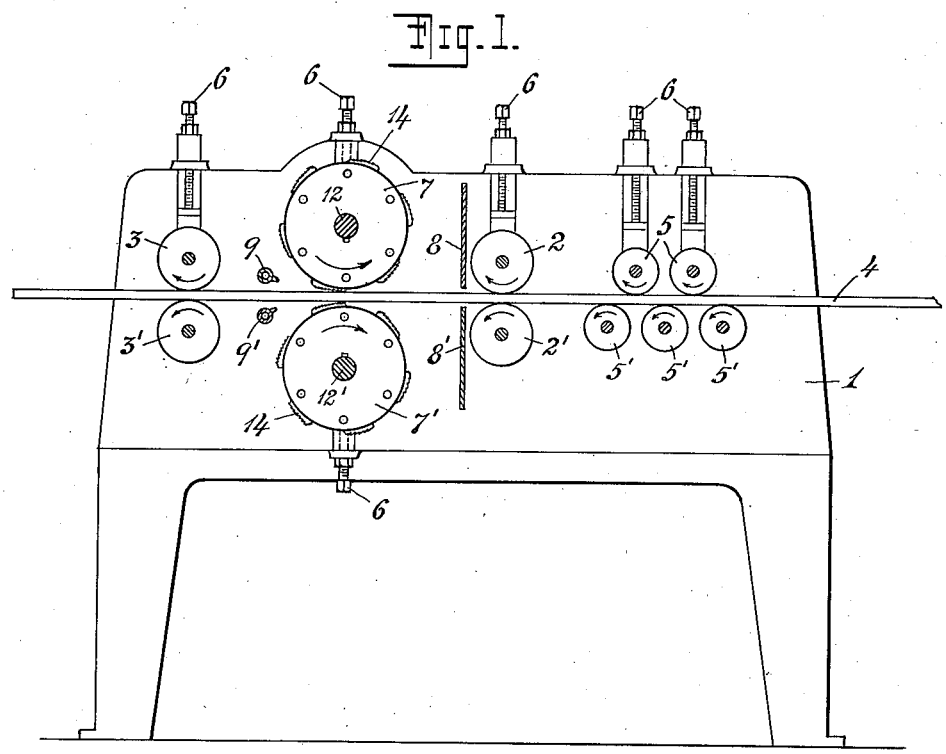
Figure 1 shows a machine embodying my invention.
Figure 4:
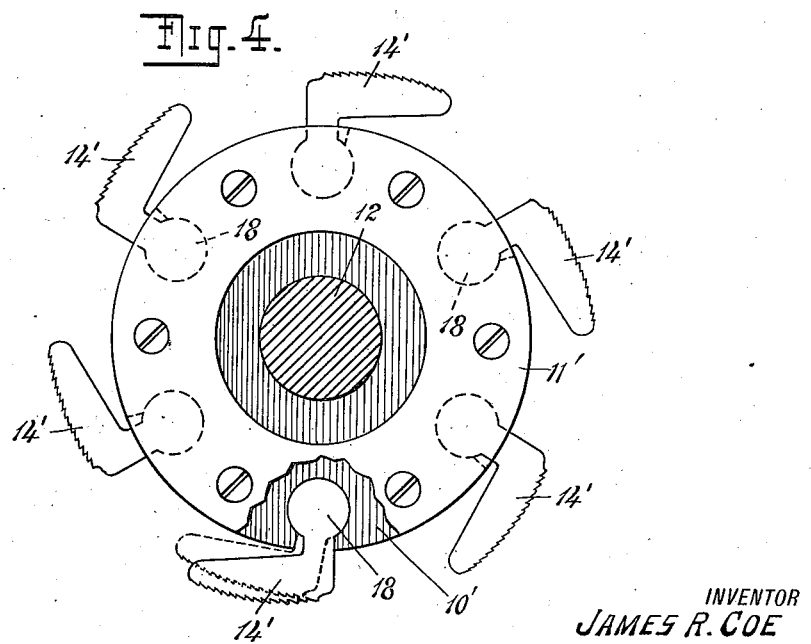
Fig. 4 shows a modification of the construction of the cutter-head.

In the modification shown in Fig. 4, 14' are the cutting members, which, instead of being mounted upon rods, are provided with circular heads 18, which fit in corresponding channels, open on one side, in the core 10' of the head, being held by end plates 11' so as to be freely movable therein in planes at right angles to the axis of the core and be thereby pivotally connected to the core so as to have movements similar to the movements of the members 14.

In scalping metal by machines embodying my invention, the plate 4, produced by rolling a one-inch casting down to a thickness of about one-half inch, is fed between the rollers 5—5', 2—2', and 3—3' so as to pass between the scalping heads 7—7', the scalping heads being revolved at a rapid rate. I have found that satisfactory results are produced in scalping brass plates when the plate 4 is fed at the rate of about twenty feet per minute and the scalping heads 7—7', being eight inches in diameter, are revolved so as to have a speed of about 2,500 lineal feet per minute, i. e., at the rate of about 1,250 revolutions per minute. When the scalping heads are revolved at this rate the pivotally mounted members 14 are thrown out by centrifugal force so as to be held against the plate 4 with considerable pressure, which pressure, however, is a yielding pressure and does not result in a uniform cutting action upon the entire surface of the plate, but, on the contrary, results in local actions, the amount of the cutting at any point depending upon the scale or pits at that point and the softness of the surface resulting therefrom. The cutter-heads 7—7' are preferably so adjusted relatively to the plate that the teeth of the members 14, which first engage the normal surface of the plate, are to some extent out of alinement with the radius passing through the axis of the head and the axis of the pivots upon which the members 14 move relatively to the head, as shown at 19 in Fig. 2, the result being that under normal conditions a cutting tooth is held in engagement with the plate by centrifugal force and tends to yield to radial pressure exerted thereon. Inasmuch as the members 14 are pivotally mounted in the head, the tooth first to strike is held against the plate with a greater pressure than the subsequent teeth, since it forms the fulcrum of a lever whose load arm is shorter relatively to its power arm than in the lever which exists when any subsequent tooth strikes the plate. The first attack, therefore, of a cutting member upon the plate is the strongest and the subsequent actions are in the nature of finishing actions in connection with which the pressure gradually reduces. The teeth more directly in line with the radius of the core which extends through the axis of the pivot, act more in the nature of ordinary milling teeth, engaging any unusual or abrupt projections which may occur upon the surface of the plate being treated. In normal action the cutter-heads with their members 14 have an action which partakes somewhat of the characteristics of both a rotary brush and a rotary milling head having a cutting action due to its teeth and yet having an active surface which is free to yield and follow any changes in the surface of the plate being treated so as to attack all portions of the plate without removing the surface thereof down to a definite line.

The members 14 are easy to manufacture and can be replaced without great expense. In case a tooth becomes broken the member still performs its function, since the next succeeding tooth of that member does the work which would have been done by the broken tooth and there being so many teeth on each member and so many members, the breaking of a few teeth does not substantially interfere with the result. Moreover, the members themselves are easily replaced at slight expense as compared with the expense of replacing a portion of an ordinary milling cutter.

On account of the yielding nature of my cutter-head, I have found it possible to combine into one and the same machine the straightening rollers 5—5′ and the scalping cutter-heads, a thing heretofore found to be impracticable. This is possible with my cutter-heads since they have yielding cutting members and the yielding members compensate for changes in the position of the surface of the plate relative to the cutters which are liable to occur.

Because my cutter-heads attack the plate locally they do not remove the surface thereof to a uniform depth. Their use, therefore, results in cutting away much less material and therefore results in the formation of much less scrap and requires much less power to operate. Furthermore, because my cutting members are given less work to do, they are less liable to injury. Furthermore, because a smaller portion of the plate is removed during the scalping process, a larger quantity of metal remains ready to be rolled into thin plates or strips so that the finished output resulting from a given amount of melting and casting is increased.

Where both sides of the plate 4 are to be overhauled, I preferably provide in the same machine two cutter-heads acting on opposite sides of the plate so as to perform the scalping operation on both sides during the single passage of the plate through the machine. In such case, I preferably place the two cutter-heads directly opposite one another as shown, in which case special backing rollers or plates are not necessary, one cutter-head acting as a backing for the plate as it is acted upon by the other cutter-head.

As will be evident to those skilled in the art, my invention permits of various modifications without departing from the spirit thereof or the scope of the appended claims.

What I claim is:

1. In a means for overhauling metal plates, the combination of a cutter head drum, a plurality of cutting members mounted therein and movable relatively thereto under the influence of centrifugal force in planes transverse to the axis of said drum, each of said members having a curved edge held adjacent to the periphery of said drum and a plurality of cutting teeth on said curved edge.

2. In a cutter head, a drum, a series of elongated toothed cutting members pivotally mounted on the exterior of said drum so as to move independently in planes at right angles to the axis of said drum, said members extending along the periphery of said drum and each being pivoted thereto at one end, the pivotal bearings being confined to one end of said cutting member and each of said plates having a series of teeth on one of its longer sides.

3. In a cutter head, a drum, a series of elongated toothed cutting members pivotally mounted on the exterior of said drum so as to move independently in planes at right angles to the axis of said drum, said members extending along the periphery of said drum and each being pivoted thereto at one end, and a stop carried by said drum and displaced from the pivots for limiting the outward throw of the other end of said members and their movement about said pivots.

4. A cutter head comprising a drum, a plurality of bars parallel to the axis of said drum, a plurality of elongated plates each lying in a plane transverse to the axis of said drum and pivoted at one end to one of said bars and provided upon its outer edge with a curved series of cutting teeth on one of its longer sides.

5. The combination of a cutter head having a drum and a series of cutter plates each provided with a plurality of teeth and movably mounted on the exterior of said drum so as to move in planes transverse to the axis thereof under the influence of centrifugal force, feed rollers adapted to supply a metal sheet to said cutter head, and straightening rollers adapted to act upon said sheet before said cutter head acts thereon.

JAMES ROBERT COE.